US012763850B2

(12) United States Patent
Åström et al.

(10) Patent No.: US 12,763,850 B2
(45) Date of Patent: Oct. 13, 2026

(54) BEAM SELECTION IN NON-TERRESTRIAL NETWORKS

(71) Applicant: Telefonaktiebolaget LM Ericsson (publ), Stockholm (SE)

(72) Inventors: Magnus Åström, Lund (SE); Johan Rune, Lidingö (SE); Olof Liberg, Enskede (SE); Helka-Liina Määttänen, Espoo (FI); Xingqin Lin, San Josè, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 372 days.

(21) Appl. No.: 18/031,949

(22) PCT Filed: Oct. 8, 2021

(86) PCT No.: PCT/EP2021/077964

§ 371 (c)(1),
(2) Date: Apr. 14, 2023

(87) PCT Pub. No.: WO2022/078919

PCT Pub. Date: Apr. 21, 2022

(65) Prior Publication Data

US 2023/0396330 A1 Dec. 7, 2023

Related U.S. Application Data

(60) Provisional application No. 63/092,218, filed on Oct. 15, 2020.

(51) Int. Cl.
*H04B 7/185* (2006.01)
*H04W 36/08* (2009.01)

(52) U.S. Cl.
CPC ..... *H04B 7/18541* (2013.01); *H04B 7/18534* (2013.01); *H04B 7/18554* (2013.01); *H04W 36/083* (2023.05)

(58) Field of Classification Search
CPC ........... H04B 7/18541; H04B 7/18534; H04W 36/083
See application file for complete search history.

(56) References Cited

U.S. PATENT DOCUMENTS 6,023,242 A * 2/2000 Dixon ..................... H01Q 3/26
342/359
9,967,081 B2 * 5/2018 Yang ......................... H04L 5/14
(Continued)

FOREIGN PATENT DOCUMENTS

WO WO-0221721 A1 * 3/2002 ............. H04B 7/086
WO WO-2007037674 A1 * 4/2007 ............. H01Q 25/00
(Continued)

OTHER PUBLICATIONS

International Search Report and Written Opinion issued in International Application No. PCT/EP2021/077964 dated Jan. 7, 2022 (13 pages).

(Continued)

*Primary Examiner* — Wesley L Kim
(74) *Attorney, Agent, or Firm* — Rothwell, Figg, Ernst & Manbeck, P.C.

(57) ABSTRACT

The invention refers to a method performed by a wireless device (10), for connecting to a second satellite (20*b*) in a non-terrestrial network, NTN, wherein the wireless device employs a first beamforming matrix for directing a radio beam from an antenna array of the wireless device to the a first satellite (20*a*), the method comprising determining an angular difference between the directions towards the first and the second satellite, determining a second beamforming matrix, for communication with the second satellite, based on a direction of the beam towards the first satellite and the determined difference in angles, and using the second beamforming matrix to configure a receiver and/or transmitter for connecting to the second satellite; the invention further (Continued)

refers to corresponding method performed by a network node comprising transmitting to the wireless device ephemeris data of the first and the second satellite order to allow the wireless device determining an angular difference between the directions towards the first and the second satellite; the invention further refers to a corresponding wireless device (10) and to a corresponding network node.

19 Claims, 10 Drawing Sheets

(56) References Cited

U.S. PATENT DOCUMENTS

| | | | | |
|---|---|---|---|---|
| 10,903,898 | B1 * | 1/2021 | Roy | H04B 7/18528 |
| 2014/0315483 | A1 * | 10/2014 | Park | H01Q 1/288 455/3.02 |
| 2015/0015436 | A1 | 1/2015 | Broquet et al. | |
| 2017/0085314 | A1 | 3/2017 | Davis | |
| 2018/0376392 | A1 | 12/2018 | Wu et al. | |
| 2019/0313391 | A1 * | 10/2019 | Lin | H04W 16/28 |
| 2020/0007216 | A1 * | 1/2020 | Nasiri Khormuji | H04B 7/063 |
| 2022/0078726 | A1 * | 3/2022 | Zhu | H04W 72/046 |

FOREIGN PATENT DOCUMENTS

| | | | | | |
|---|---|---|---|---|---|
| WO | 2017/189862 | A1 | | 11/2017 | |
| WO | WO-2018141868 | A1 | * | 8/2018 | H04B 7/0617 |

OTHER PUBLICATIONS

Thales, "Study on solutions evaluation for NR to support Non Terrestrial Network", 3GPP TSG RAN meeting #80, RP-181370, La Jolla, USA, Jun. 11-14, 2018 (5 pages).

3GPP Tr 38.811 V15.4.0 (Sep. 2020), 3rd Generation Partnership Project; Technical Specification Group Radio Access Network; Study on New Radio (NR) to support non-terrestrial networks (Release 15), Sep. 2020 (127 pages).

* cited by examiner

BEAM SELECTION IN NON-TERRESTRIAL NETWORKS

CROSS REFERENCE TO RELATED APPLICATIONS

This application is a 35 U.S.C. § 371 National Stage of International Patent Application No. PCT/EP2021/077964, filed 2021 Oct. 8, which claims priority to U.S. provisional application No. 63/092,218, filed on 2020 Oct. 15, which is incorporated by this reference.

TECHNICAL FIELD

The present application relates generally to the field of wireless communication networks, and more specifically to communications in non-terrestrial network (NTN) between satellite based radio access nodes and a wireless device.

BACKGROUND

In 3GPP Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality. Since Release 13 NB-IoT and LTE-M are part of the LTE specifications and provide connectivity to massive machine type communications (mMTC) services.

In 3GPP Release 15, the first release of the 5G system (5GS) was specified. This is a new generation's radio access technology intended to serve use cases such as enhanced mobile broadband (eMBB), ultra-reliable and low latency communication (URLLC) and mMTC. 5G includes the New Radio (NR) access stratum interface and the 5G Core Network (5GC). The NR physical and higher layers are reusing parts of the LTE specification, and additional components are introduced when motivated by the new use cases.

In Release 15, 3GPP also started the work to prepare NR for operation in a Non-Terrestrial Network (NTN). The work was performed within the study item "NR to support Non-Terrestrial Networks" and resulted in 3GPP TR 38.811.

In Release 16 the work to prepare NR for operation in an NTN network continued with the study item "Solutions for NR to support Non-Terrestrial Network". In parallel the interest to adapt LTE for operation in NTN is growing. As a consequence, 3GPP is working on support for NTN in both LTE and NR in Release 17.

Satellite Communications:

FIG. 1 shows an example architecture of a satellite network with bent pipe transponders. A satellite radio access network usually includes the following components:

- A satellite that refers to a space-borne platform;
- an earth-based gateway that connects the satellite to a base station (BS) or a core network, depending on the choice of architecture;
- a feeder link that refers to the link between a gateway and a satellite; and
- an access link that refers to the link between a satellite and a UE.

Depending on the orbit altitude, a satellite may be categorized as low earth orbit (LEO), medium earth orbit (MEO), or geostationary earth orbit (GEO) satellite.

- LEO: typical heights ranging from 250-1,500 km, with orbital periods ranging from 90-120 minutes.
- MEO: typical heights ranging from 5,000-25,000 km, with orbital periods ranging from 3-15 hours.
- GEO: height at about 35,786 km, with an orbital period of 24 hours.

The significant orbit height means that satellite systems are characterized by a path loss that is significantly higher than what is expected in terrestrial networks. To overcome the pathloss it is often required that the access and feeder links are operated in line of sight conditions, and that the UE is equipped with an antenna offering high beam directivity.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometres. By way of example, FIG. 1 shows 4 spotbeams that may partially overlap to each other.

The NTN beam may in comparison to the beams observed in a terrestrial network be very wide and cover an area outside of the area defined by the served cell. Beams covering adjacent cells will overlap and cause significant levels of intercell interference. To overcome the large levels of interference a typical approach for an NTN is to configure different cells with different carrier frequencies and polarization modes.

Throughout this invention the terms beam and cell may be used interchangeably, unless explicitly noted otherwise. The invention is focused on NTN, but the methods proposed apply to any wireless network dominated by line of sight conditions.

Ephemeris Data:

As captured in 3GPP TR 38.821 ephemeris data shall be provided to the UE, for example to assist with pointing a directional antenna (or an antenna beam) towards the satellite, and to calculate correct Timing Advance (TA) and Doppler shift.

As depicted in FIG. 2, a satellite orbit can be fully described using 6 parameters. Which set of parameters is exactly to be used can be decided by the system design; many different representations are possible. FIG. 2 by way of example, shows a choice of parameters used often in astronomy, wherein the set of parameters may be represented by $\{a, \varepsilon, i, \Omega, \omega, t\}$. Herein, the semi-major axis a and the eccentricity ε describe the shape and size of the orbit ellipse; the inclination i, the right ascension of the ascending node Ω, and the argument of periapsis ω determine its position in space, and the epoch t determines a reference time (e.g. the time when the satellites moves through periapsis).

A two-line element set, TLE, is a data format encoding a list of orbital elements of an Earth-orbiting object for a given point in time, the epoch. As an example of a different parametrization, TLEs use mean motion n and mean anomaly M instead of a and t.

A completely different set of parameters may be represented by the values of the position and velocity vector $(x, y, z, v_x, v_y, v_z)$ of a satellite. These vectors are sometimes called orbital state vectors. They can be derived from the orbital elements and vice versa since the information they contain is equivalent. All these formulations (and many others) are possible choices for the format of ephemeris data to be used in NTN.

It would be desirable that a UE can determine the position of a satellite with accuracy of at least a few meters. However, several studies have shown that this might be hard to achieve when using the de-facto standard of TLEs. On the other hand, LEO satellites often have GNSS receivers and can determine their position with some meter level accuracy.

Another aspect discussed during the study item and captured in 3GPP TR 38.821, is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data may be updated quite frequently. The update frequency depends on the satellite and its orbit and ranges from weekly to multiple times a day for satellites on very low orbits which are exposed to strong atmospheric drag and need to perform correctional maneuvers often.

While it seems possible to provide the satellite position with the required accuracy, care may to be taken to meet these requirements, e.g. when choosing the ephemeris data format, or the orbital model to be used for the orbital propagation.

Ephemeris data consists of at least 5 parameters describing the shape and position in space of the satellite orbit. It may also come with a timestamp, which is the time when the other parameters describing the orbit ellipse were obtained. The position of the satellite in the nearer future of any given time can be predicted from this data using orbital mechanics. The accuracy of this prediction will however degrade as one projects further and further into the future. The validity time of a certain set of parameters depends on many factors like the type and altitude of the orbit, but also the desired accuracy, and ranges from the scale of a few days to a few years.

Linear Algebra Operations:

The direction between two objects in 3D space is determined by the difference in position between the two objects. For example, the direction from a point $p_0$ ($x_0$, $y_0$, $z_0$), to a point $p_1$ ($x_1$, $y_1$, $z_1$) is $$v_1=p_1-p_0=(x_1-x_0, y_1-y_0, z_1-z_0)$$

The angle between two normalized 3D vectors, $v_1$ and $v_2$, is determined as the dot product of the two vectors, i.e., $$\phi=\cos^{-1} v_1 \cdot v_2$$

In linear algebra, a rotation matrix is a matrix that is used to perform a rotation in the Euclidean space. For example, the matrix $R_x(\phi)$ will perform a rotation around the x axis with the angle $\phi$:

$$R_x(\phi)=\begin{bmatrix}1 & 0 & 0\\ 0 & \cos\phi & -\sin\phi\\ 0 & \sin\phi & \cos\phi\end{bmatrix}$$

Corresponding matrices can be defined for rotations around the y and z axes. A general rotation is formed by combining rotations around the three axes.

FIG. 3 depicts an exemplary antenna array comprising a plurality of antenna elements located in an antenna plane. By way of example, the antenna array comprises N*M antenna elements e.g. equally spaced (with distance d) in both planar axes (e.g. the x-axis and the y-axis). The direction of an impinging wave, relative the antenna plane normal will result in a difference in distance to each antenna element in the planar array.

The path difference of wave $\beta_{m,n}$, of an exemplary antenna element denoted by index n in the direction of the x-axis and index m denoted by the direction of the y-axis ($m^{th}$, $n^{th}$ antenna element), with 1≤m≤M and 1≤n≤N, with respect to the origin of the antenna plane, can be expressed as $$\beta_{m,n}=(m-1)u+(n-1)v,$$

where u and v are the unitary path differences along the Y axis and X axis, respectively. Further assuming the antenna element spacing d equals half the wavelength, λ, i.e., $$d=\frac{\lambda}{2},$$

u and v may be expressed as, $$u=\pi \sin\phi \sin\theta$$

$$v=\pi \cos\phi \sin\theta$$

where $$\theta\in\left\{0, \frac{\pi}{2}\right\} \text{ and } \phi\in\left\{-\frac{\pi}{2}, \frac{\pi}{2}\right\}.$$

In order to point the beam in the direction of the impinging wave, i.e., coherently combine the antenna elements in that direction, the received signal of the $m^{th}$, $n^{th}$ antenna element needs to be phase shifted with an amount corresponding to the path difference of that element in relation to the carrier wavelength $$\varphi=2\pi\frac{\beta_{m,n}}{\lambda}$$

In 3GPP Release 17, work is ongoing on adapting NR, and studying LTE, for operation in an NTN. In NR and LTE, the UE performs initial search over its supported frequency bands for a PLMN when it is turned on to find a cell to camp on. The UE also performs cell reselection in idle/inactive mode and handover in connected mode where knowing the location of a satellite can be beneficial.

In an NTN, a UE using a directional antenna must, in worst case, search for a satellite to camp on over the entire sky, i.e., from horizon to horizon. The network typically provides information to the UE on where to find neighboring cells in frequency, but without information on where the UE has to point its antenna. But even if the UE would know ephemeris data of a satellite and use it to calculate the elevation angle to a candidate satellite, such angle would not be sufficient to determine a beam direction to point to such satellite.

SUMMARY

Exemplary embodiments disclosed herein address at least some of these problems, issues, and/or drawbacks of existing solutions.

An embodiment concerns a method, performed by a wireless device (or UE), for connecting to a second satellite in a non-terrestrial network, NTN, wherein the wireless device employs a first beamforming matrix for directing a radio beam from an antenna array (comprising a plurality of antennas arranged in a plane) of the wireless device to a first satellite.

The antenna array, also being referred to as antenna plane comprises a plurality of antenna elements that may e.g. be provided equidistantly in both antenna plane directions. By applying a beamforming matrix (or precoder or precoding matrix) to the antenna array the plurality of antenna elements are controlled to send and/or receive a radio beam into/from a certain direction.

The method may comprise the following steps:

determining an angular difference between the directions towards the first and the second satellite;

determining a second beamforming matrix, for communication with the second satellite, based on a direction of the beam towards the first satellite and the determined difference in angles; and using the second beamforming matrix to configure a receiver and/or transmitter of the wireless device to send and/or receive a radio beam into/from the direction towards the second satellite.

The angular difference may be expressed in a set of two difference angles, e.g. an difference in azimuth angle and an in elevations angle between both satellites.

Alternatively, the angular difference may be expressed as single (cone) angle that is used to define a search space on whose surface the beam towards the new satellite should be directed or received.

Another embodiment concerns a method provided by a network node for connecting a wireless device (or UE) to a second satellite in a non-terrestrial network, NTN, wherein the wireless device employs a first beamforming matrix for directing a radio beam from an antenna array of the wireless device to a first satellite, the method comprising:

transmitting to the wireless device ephemeris data of the first and the second satellite order to allow the wireless device determining an angular difference between the directions towards the first and the second satellite.

The network node may be part of or incorporated in a satellite, e.g., in the first satellite.

Other exemplary embodiments include NTN nodes (e.g., satellites, gateways, base stations, or components thereof) and user equipment (UEs, e.g., wireless devices) configured to perform operations corresponding to any of the exemplary methods and/or procedures described herein.

Other exemplary embodiments include non-transitory, computer-readable media storing program instructions that, when executed by processing circuitry, configure such NTN nodes or UEs to perform operations corresponding to any of the exemplary methods and/or procedures described herein.

These and other objects, features and advantages of the present disclosure will become apparent upon reading the following Detailed Description in view of the Drawings briefly described below.

DETAILED DESCRIPTION

Figure 1:
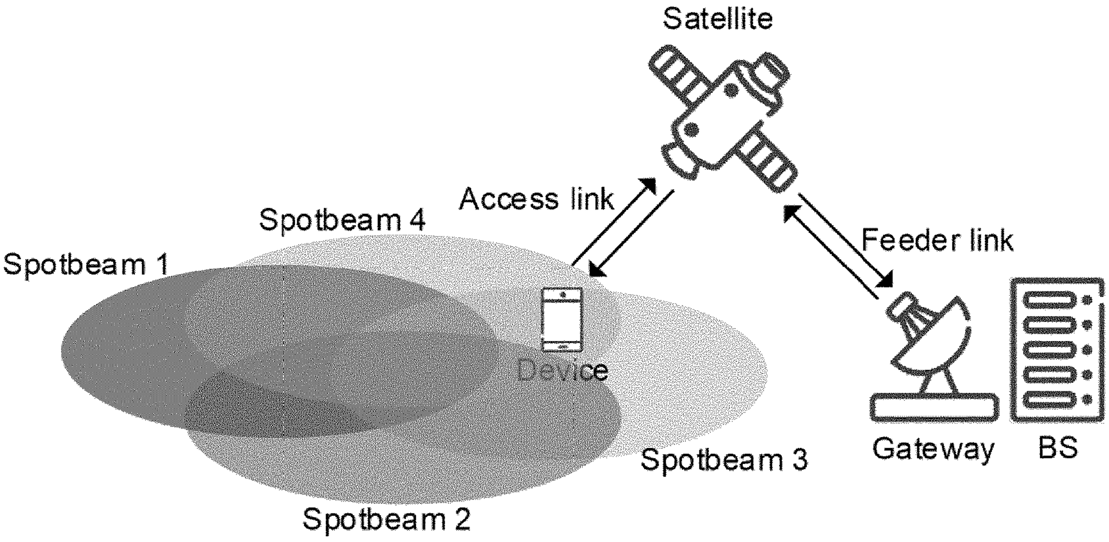
FIG. 1 shows an example architecture of a satellite network.
Figure 2:
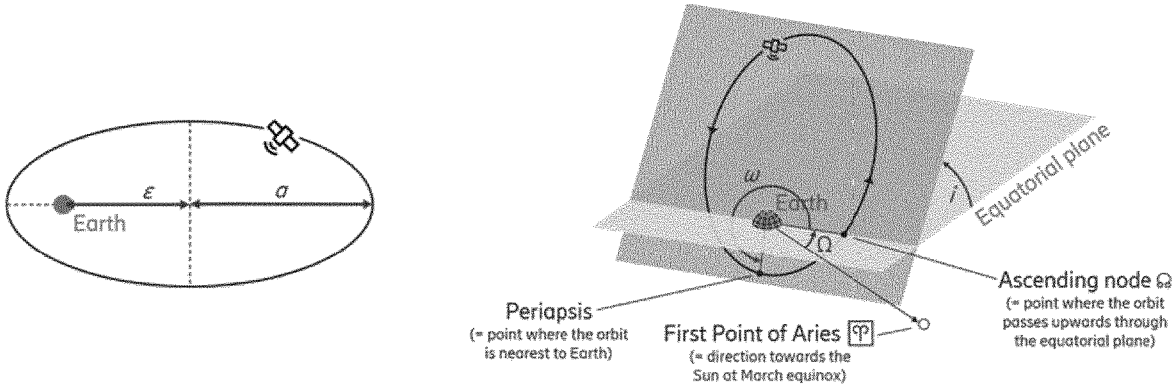
FIG. 2 depicts orbital elements comprising a set of parameters describing a satellite orbit.
Figure 3:
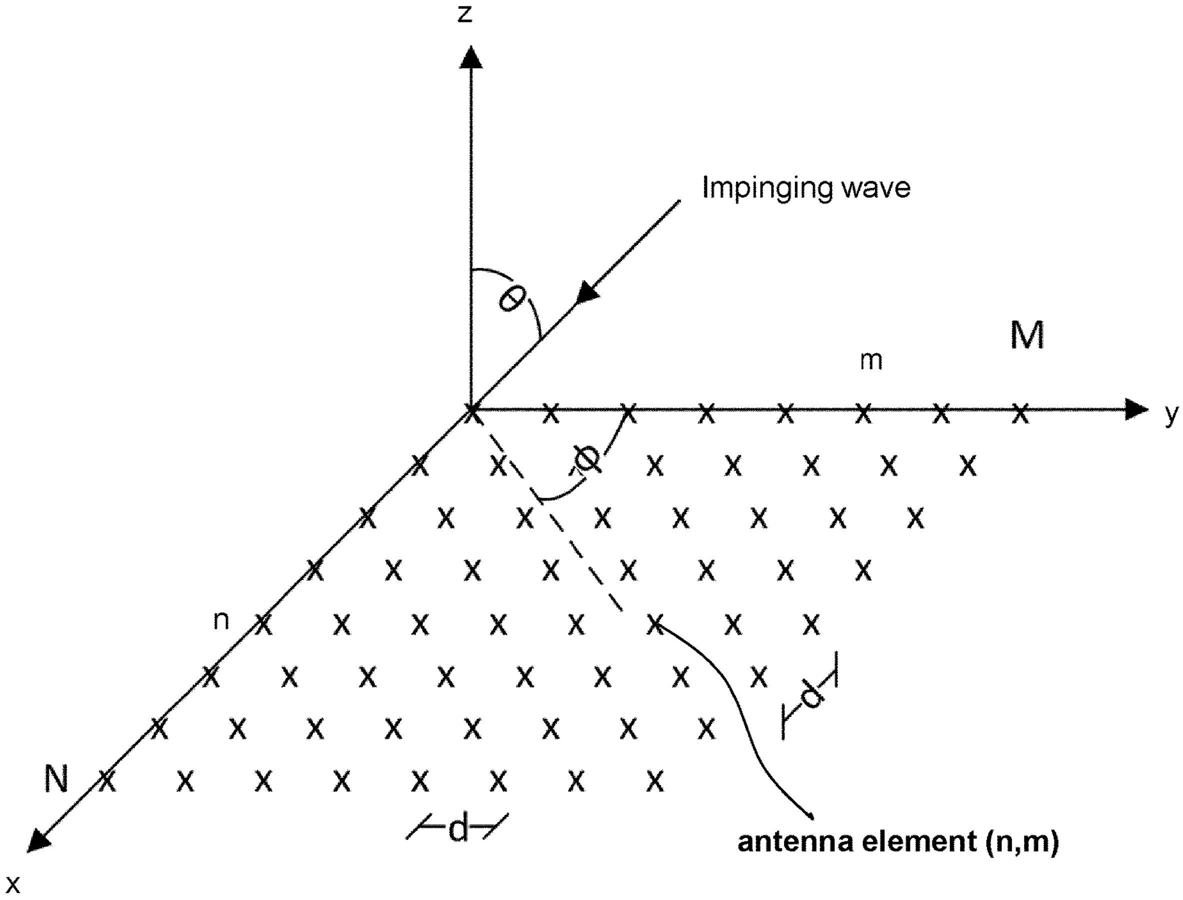
FIG. 3 depicts a model of a planar antenna array and an impinging wave in relation to the antenna plane.

Some of the embodiments contemplated herein will now be described more fully with reference to the accompanying drawings. The following terms are used throughout the description given below:

Radio Access Node: As used herein, a “radio access node” (or “radio network node”) can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, a relay node, and a non-terrestrial access node (e.g., satellite or gateway).

Core Network Node: As used herein, a “core network node” is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a “wireless device” (or “WD” for short) is any type of device that has access to (i.e., is served by) a cellular communications network by communicate wirelessly with network nodes and/or other wireless devices. Unless otherwise noted, the term “wireless device” is used interchangeably herein with “user equipment” (or “UE” for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a “network node” is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

It may be noted that the description given herein focuses on a 3GPP cellular communications system and, accordingly, 3GPP terminology or terminology similar to 3GPP terminology is used throughout this document. However, the concepts disclosed herein are not limited to a 3GPP system. The present invention may as well be implemented in communication technologies like Wide Band Code Division Multiple Access (WCDMA), Worldwide Interoperability for Microwave Access (WiMax), Ultra Mobile Broadband (UMB).

In addition, functions and/or operations described herein as being performed by a wireless device or a network node may be distributed over a plurality of wireless devices and/or network nodes. Furthermore, although the term "cell" is used herein, it should be understood that beams may be used instead of cells, e.g., in a 5G NR system, and concepts described herein apply equally to both cells and beams. In addition, although the embodiments of the present disclosure are described in terms of 3GPP non-terrestrial networks (NTNs) that utilize LTE and/or NR technologies, such embodiments are equally applicable to any wireless network dominated by line of sight conditions, including terrestrial networks.

As briefly mentioned above, current LTE and NR technologies were developed for terrestrial cellular networks and adapting them to NTNs can create various issues, problems, and/or drawbacks for operation of networks and UEs. These issues are discussed in more detail below.

Embodiments describe herein refer to a method in a device for switching access links between a first and second serving node (e.g. satellite, high altitude platform station), e.g., between a first departing and a second arriving node in a fixed area network. The invention is also applicable in the case where a device keeps the same access link with a first satellite and updates beam selection when the first satellite moves from a first position to a second position.

In the following, the term "satellite" will be interchangeably used with the terms "network node" or "serving node" in order to emphasis its non-terrestrial position.

Further the term device may be interchangeably used with the terms "wireless device" or "UE".

In some embodiments, the device gets knowledge about the satellite positions at some points in time, e.g., by receiving control messages or system information about ephemeris data of satellites, e.g. by receiving from a first satellite ephemeris data about the position of the first satellite, and about a position of a second satellite.

Additionally, the device may have knowledge about its own position, e.g. by means of a global navigation satellite system GNSS (such as GPS) or from receiving information from the network.

By way of example, the UE may be connected to the first satellite (by means of a RX beam and/or TX beam) and may consider connecting to the second satellite. The first and the second satellite are (or comprise) access nodes of the communications network (such as 3GPP radio networks as described above). By way of example, the UE is provided with an antenna array comprising a plurality of antennas. By applying a beamforming matrix, the UE directs (TA and/or RX) beam into a certain direction. By way of example, the UE applies a first beamforming matrix to direct a beam to the first satellite to communicate with the network (to connect to that satellite). Beamforming matrix, beamformer, precoder, precoding matrix, combiner may be interchangeably used in this context. It may further be assumed that the beams form so-called line of sight channels, thus implying an unambiguous mapping between a direction of as beam towards the satellite and a beamforming matrix establishing the beam in that direction.

Figure 4:
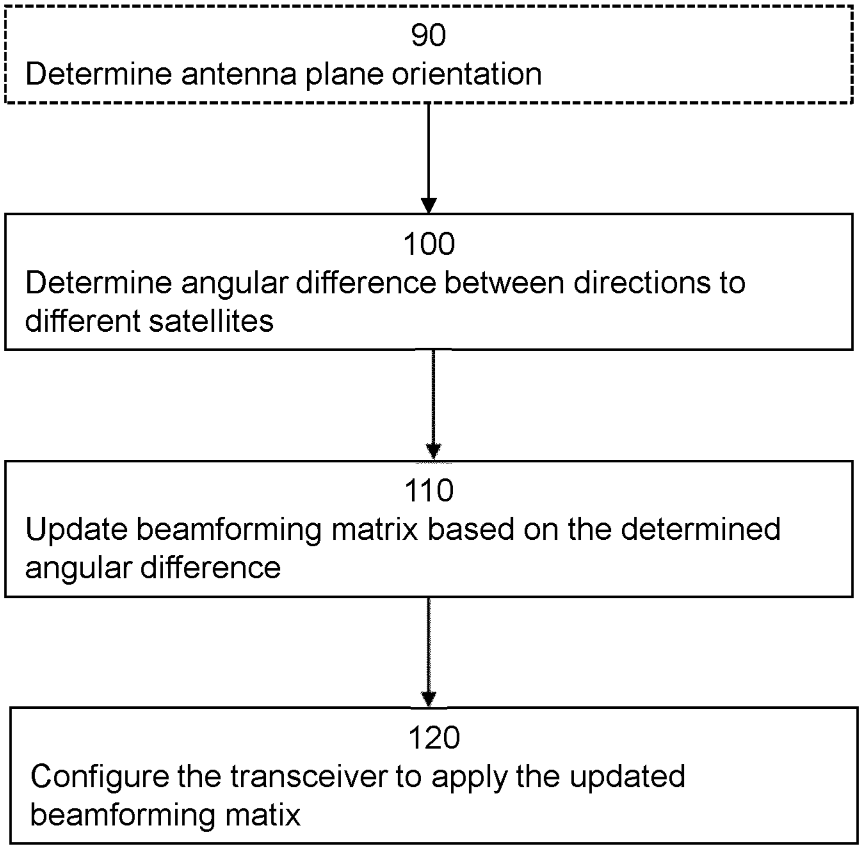
FIG. 4 shows an exemplary flow chart of steps to be performed by a UE according to embodiments of the invention.

FIG. 4 depicts an exemplary sequence of method steps to connect to the second satellite:

In a first step 100, the device uses the obtained ephemeris data (of the first satellite and the second satellite) to determine a difference in angle between the first and second satellite. This angular difference may, e.g., be composed of an azimuth difference and/or an elevation difference.

In a second step 110, the device determines an updated (or second) beamforming matrix for communications with the second satellite. This second beamforming matrix may be based on an existing (e.g. the first) beamforming matrix, or directional information to the first satellite and the difference in angle between the two satellites.

In a third step 120, the second beamforming matrix is configured for communication with the second satellite.

In an embodiment, the device location and antenna plane orientation are both known to the device. It is then possible to determine the second beamforming matrix by rotating the first beamforming matrix pointing towards the first satellite. Thereto, the UE may determine a rotation matrix by which the first beamforming matrix is to be rotated, such that an updated (second) beamforming matrix is created, resulting in a beam pointing towards the second satellite.

In an embodiment, it may be assumed the device location is known while the antenna plane orientation (in space) is unknown. In such circumstances, an optional step 90 may be performed, wherein the antenna plane orientation is derived (estimated) from a beamforming matrix aiming towards a satellite with known ephemeris data.

In an embodiment, upon successfully connecting to the second satellite, the beam direction may be further refined by performing an iterative search or a grid search in an area surrounding the identified location.

As previously mentioned, during cell reselection the UE already has a selected RX beam to the old (first) satellite and can use this as reference instead of, or complementing knowledge of the own antenna orientation (the own orientation may be known exactly or with some uncertainty). Based on ephemeris data of the old and the new (second) satellite, the UE can calculate the angular difference in directions (in space) towards the old and the new satellite and then use the direction of the RX beam to the old satellite to calculate the direction of the new RX beam (or determine a limited number of possible RX beam candidates) to use to direct to the new satellite.

Figure 5:
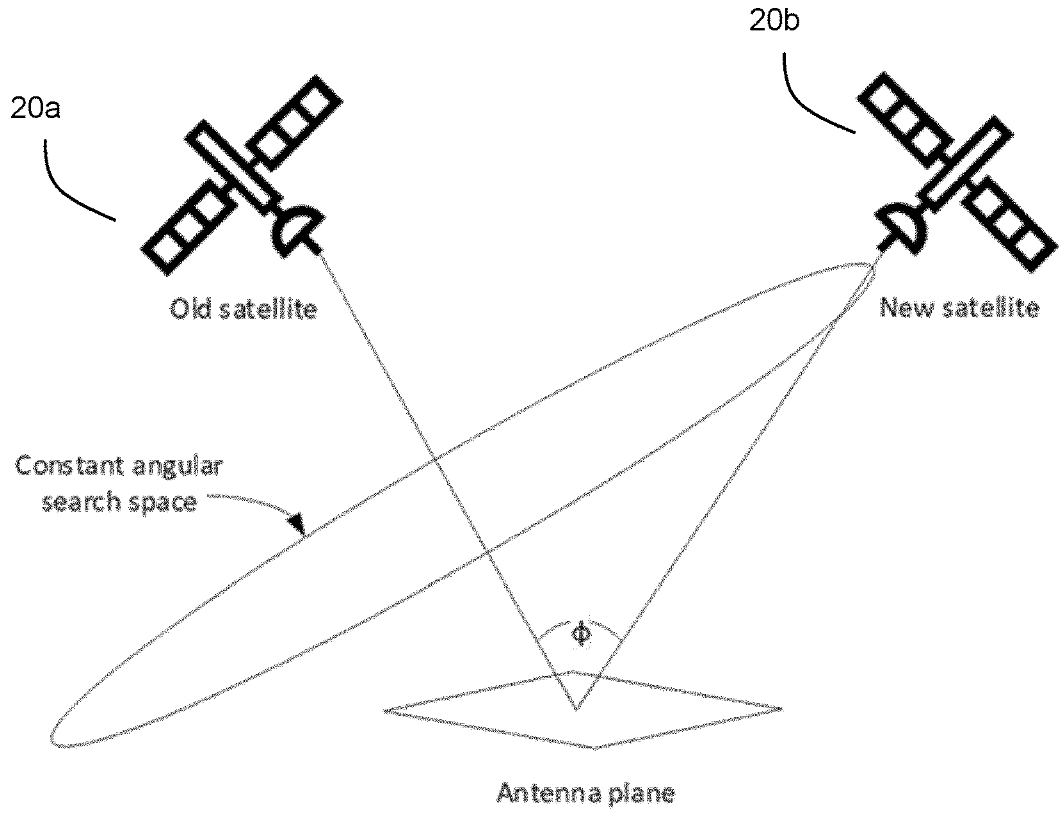
FIG. 5 shows an angular search space with respect to an antenna plane.

In an embodiment, if the UE is uncertain about its own orientation in space (e.g. does not have knowledge about its orientation), the UE may determine a certain search space to search for the new satellite. Thereto, FIG. 5 exemplarily shows an old satellite 20*a* and a new satellite 20*b* and an antenna plane of the UE that are lined by a search space applied in the UE. This search space may be determined by an angle (or angular difference) $\phi$ with respect to the antenna plain of the UE as illustrated in FIG. 5. This angle defines a cone with the UE at the tip and the RX beam to the old satellite along the cone's center line and with the RX beam towards the new satellite being located somewhere along the surface of the cone.

Hence, even if the antenna plane orientation is unknown (or uncertain), the UE may determine an angular difference $\phi$ between satellite positions of the old and new satellite and use this angular difference to define a reduced search space. In the described example, the UE would only need to search the cone (defined by the constant angular difference $\phi$).

Figure 6:
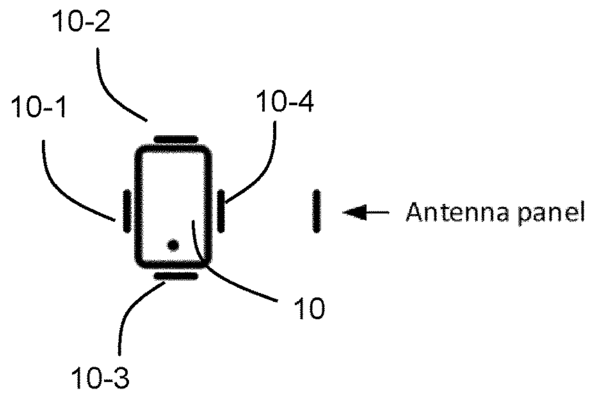
FIG. 6 shows an exemplary UE equipped with a plurality of antenna panels.

In an embodiment, to improve the UE's knowledge of its orientation, the UE may employ one or a plurality of sensors, such as acceleration sensors. Therein, the UE may determine the vertical direction (and thus the horizontal plane and the UE's own orientation (or the antenna plain orientation) in relation to it). With knowledge of the vertical direction, the UE may calculate two cones, one around the RX beam towards the old satellite and one around the vertical direction based on the elevation angle (e.g. known from ephemeris data and the UE's own position) of the new satellite. Since the UE will be at the tip of both cones, the cones' intersection with each other form two straight lines, where these two lines represent the two possible candidates for RX beam directions. FIG. 6 shows above-described UE 10 with exemplarly four antenna panels 10-1-10-4. having each different antenna plain orientations. In that case, switching between different satellites 20*a* and 20*b* may also involve switching between different antenna panels 10-1-10-4 to use for the satellite connection. By way of example, the link to the first satellite 20*a* may use a first antenna panel 10-1 and the link to the second satellite 20*b* may use a second panel 10-2. For this case, the determining step 100 as discussed above may also involve determining a preferred antenna panel to use for connecting with the second satellite.

This step may further comprise determining a corresponding rotation matrix such switching from one antenna panel to another antenna panels will result in. In this case, the rotation matrix may be known in advance if antenna panel installations are assumed to be fixed. Hence, it is possible to decompose the rotation matrix from the angular difference in three steps:

1. determining the direction towards the first satellite relative to the first antenna panel plane;
2. determining the angular difference between the two antenna planes;
3. determining the direction towards the second satellite relative to the second antenna plane normal.

In a further optional step, upon failing to connect to the second satellite, e.g. due to the signal falling below a threshold or the device being unable to configure the desired beamforming matrix, the device may attempt to connect to a third satellite using the same procedure as when connecting to the second satellite.

In a further embodiment, a mapping between UE beams and bandwidth parts (BWPs) is determined. The mapping may be configured by the network. When UE determines beam selection from a first beam to a second beam (using the same antenna panel or a different antenna panel), the UE also determines the needed switch from a first BWP mapped to the first beam to a second BWP mapped to the second beam. Accordingly, upon the switch from the first beam to the second beam, the UE may also switch its BWP from the first BWP to the second BWP.

In another embodiment, the wireless device uses multiple antenna panels to estimate its own orientation using Rx beams to multiple satellites assuming that the device knows its own position and the position of those satellites, e.g., via ephemeris information, which may be provided via broadcast signaling or some other means from at least of the those satellites.

Although the embodiments disclosed herein are described in relation to a 3GPP wireless network, such as the example wireless network, the embodiments described herein can be implemented in any appropriate type of communication system using any suitable components. The wireless network can provide communication and other types of services to one or more UEs to facilitate the UE' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The network can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

In some embodiments, a UE can be configured to communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. In some embodiments, a UE can be configured to transmit and/or receive information without direct human interaction. For instance, a UE can be designed to transmit information to a network on a predetermined schedule, when triggered by an internal or external event, or in response to requests from the network.

Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A UE can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a UE can represent a machine or other device that performs monitoring and/or measurements, and transmits the results of such monitoring and/or measurements to another UE and/or a network node. The UE can in this case be a machine-to-machine (M2M) device, which can in a 3GPP context be referred to as an MTC device. As one particular example, the UE can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE can represent a vehicle or other equipment that is capable of monitoring and/or reporting on its operational status or other functions associated with its operation. A UE as described above can represent the endpoint of a wireless connection, in which case the device can be referred to as a wireless terminal. Furthermore, a UE as described above can be mobile, in which case it can also be referred to as a mobile device or a mobile terminal.

Figure 7:
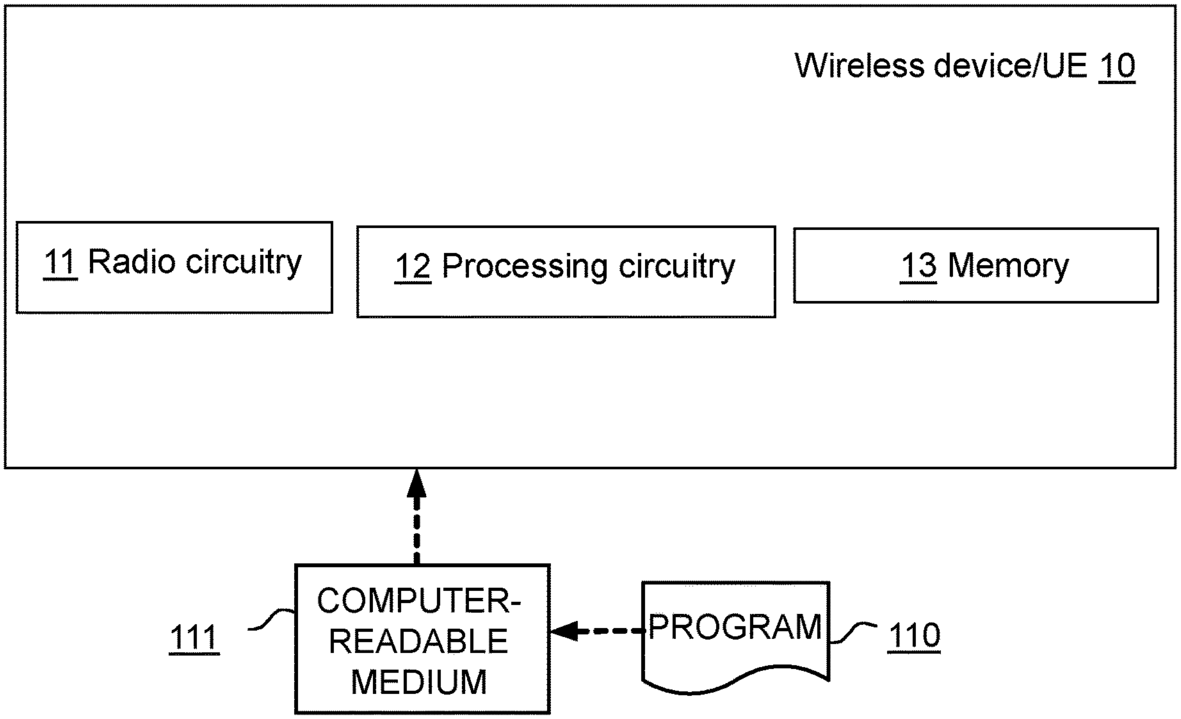
FIG. 7 is an exemplary block diagram of a UE.

As illustrated in FIG. 7, UE 10 (or wireless device, WD) includes an antenna processing circuitry or radio circuitry 11, device-readable medium 11, processing circuitry 12 and memory 13. The UE further may comprise a user power source and power circuitry. UE can include multiple sets of one or more of the illustrated components for different wireless technologies supported by UE, such as, for example, GSM, WCDMA, LTE, NR, WiFi, WiMAX, or Bluetooth wireless technologies, just to mention a few. These wireless technologies can be integrated into the same or different chips or set of chips as other components within UE 10.

The UE further comprises an Antenna that can include one or more antenna arrays 10-1-10-4, configured to send and/or receive wireless signals. In certain alternative embodiments, the antenna can be separate from UE 10 and be connectable to UE 10 through an interface or port.

Processing circuitry 12 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other UE 10 components, such as device-readable medium 11, UE 10 functionality. Such functionality can include providing any of the various wireless features or benefits discussed herein. For example, processing circuitry 12 can execute instructions stored in device-readable medium 111 or in memory 110 within processing circuitry 12 to provide the functionality disclosed herein.

Processing circuitry 12 can be configured to perform any determining, calculating, or similar operations (e.g., certain obtaining operations) described herein as being performed by a UE. These operations, as performed by processing circuitry 12, can include processing information obtained by processing circuitry 12 by, for example, converting the obtained information into other information, comparing the obtained information or converted information to information stored by UE 10, and/or performing one or more operations based on the obtained information or converted information, and as a result of said processing making a determination.

Figure 8:
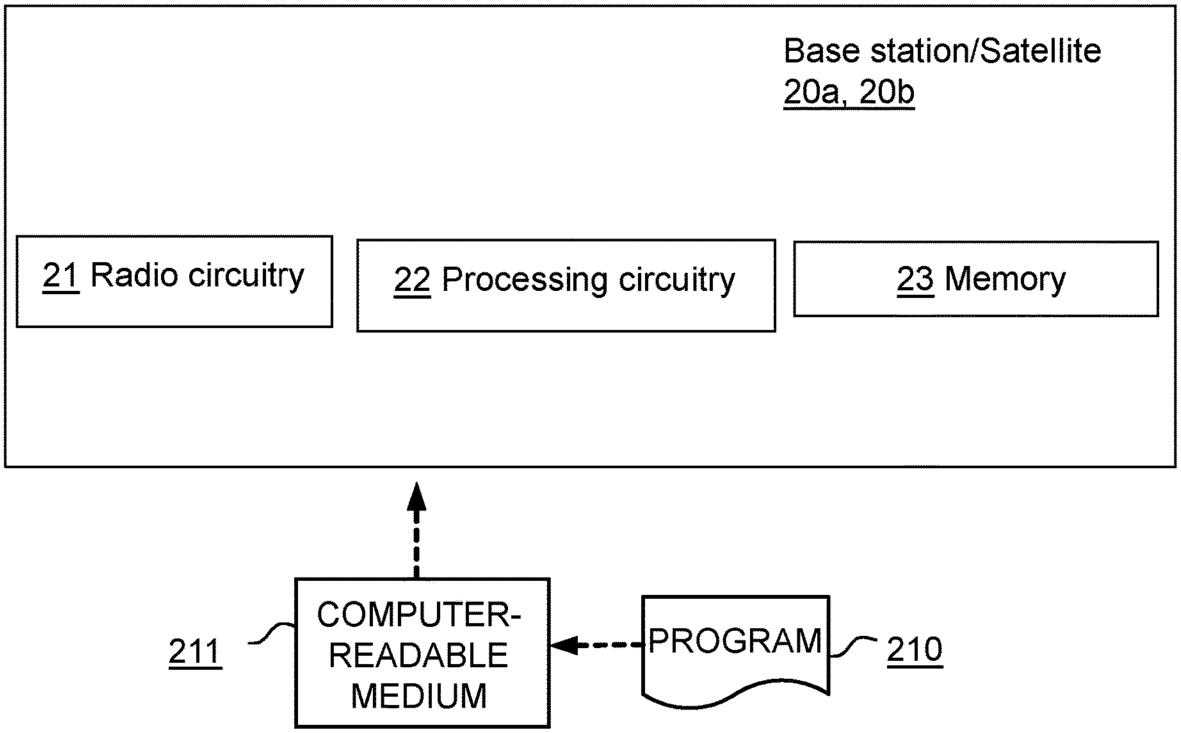
FIG. 8 is an exemplary block diagram of a satellite node.

FIG. 8 shows a block diagram of an exemplary network node 20*a* or network node 20*b*, that may also be referred to as base station or satellite (node) according to various embodiments of the present disclosure, including those described above with reference to other figures. For example, exemplary network node 20*a* or 20*b* can be configured by execution of instructions, stored on a computer-readable medium, to perform operations corresponding to one or more of the exemplary methods described herein. In some exemplary embodiments, network nodes 20*a* and 20*b* can comprise a base station, eNB, gNB, or one or more components thereof. For example, network nodes 20*a* and 20*b* can be configured as a central unit (CU) and one or more distributed units (DUs) according to NR gNB architectures specified by 3GPP. More generally, the functionally of network nodes 20*a* and 20*b* can be distributed across various physical devices and/or functional units, modules, etc.

Network nodes 20*a* and 20*b* can include processor 22 (also referred to as "processing circuitry") that is operably connected to program memory 211 and data memory 210 via a data bus, which can include parallel address and data buses, serial ports, or other methods and/or structures known to those of ordinary skill in the art.

Program memory 211 can store software code, programs, and/or instructions that, when executed by processor 22, can configure and/or facilitate network nodes 20*a* and 20*b* to perform various operations, including operations corresponding to various exemplary methods described herein. As part of and/or in addition to such operations, program memory 211 can also include software code executed by processor 22 that can configure and/or facilitate network nodes 20*a* and 20*b* to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio circuitry 21 and/or core network interface 1050. Data memory 203 can comprise memory area for processor 202 to store variables used in protocols, configuration, control, and other functions of network nodes 20*a* and 20*b*. As such, program memory 211 and data memory 23 can comprise non-volatile memory (e.g., flash memory, hard disk, etc.), volatile memory (e.g., static or dynamic RAM), network-based (e.g., "cloud") storage, or a combination thereof. Processor 22 can include multiple individual processors (not shown), each of which implements a portion of the functionality described above.

Figure 9:
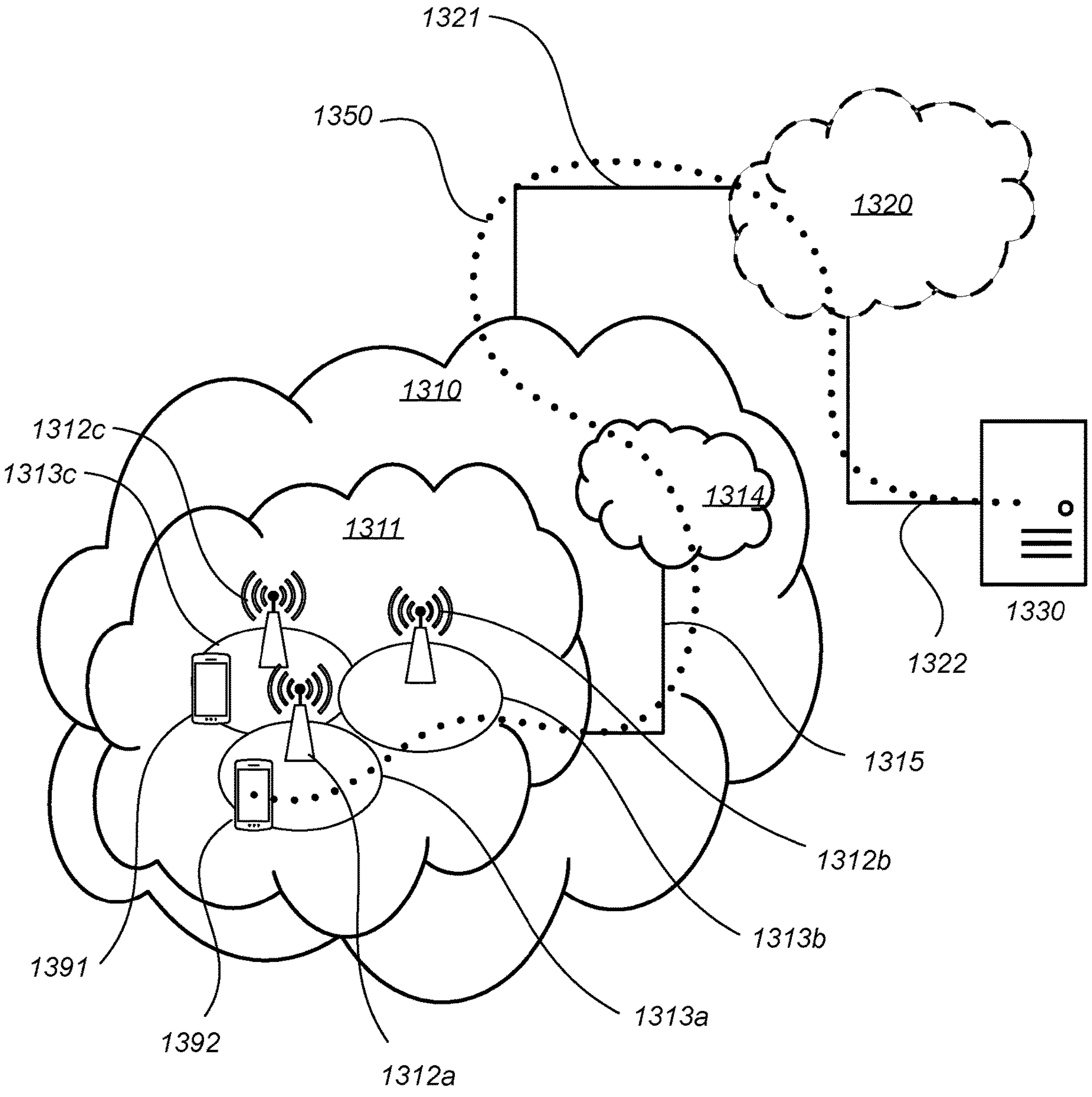
FIG. 9 is a schematic block diagram illustrating a telecommunication network connected via an intermediate network to a host computer.

FIG. 9: Telecommunication network connected via an intermediate network to a host computer in accordance with some embodiments With reference to FIG. 9, in accordance with an embodiment, a communication system includes telecommunication network 1310 such as the wireless communications network 100, for example, a 3GPP-type cellular network, which comprises access network 1311, such as a radio access network, and core network 1314. Access network 1311 comprises a plurality of network nodes such as any, or both, of the first node 111 and the second node 112. For example, base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A plurality of user equipments, such as the user equipment 130 may be comprised in the wireless communications network 100. In FIG. 9, a first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312. Any of the UEs 1391, 1392 may be considered examples of the user equipment 130.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 9 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

In relation to FIGS. 10, 11, 12, 13, and 14, which are described next, it may be understood that a UE is an example of the user equipment 130, and that any description provided for the UE equally applies to the user equipment 130. It may be also understood that the base station may be considered an example of any, or both, of the first node 111 and the second node 112, and that any description provided for the base station equally applies to any, or both, of the first node 111 and the second node 112.

Figure 10:
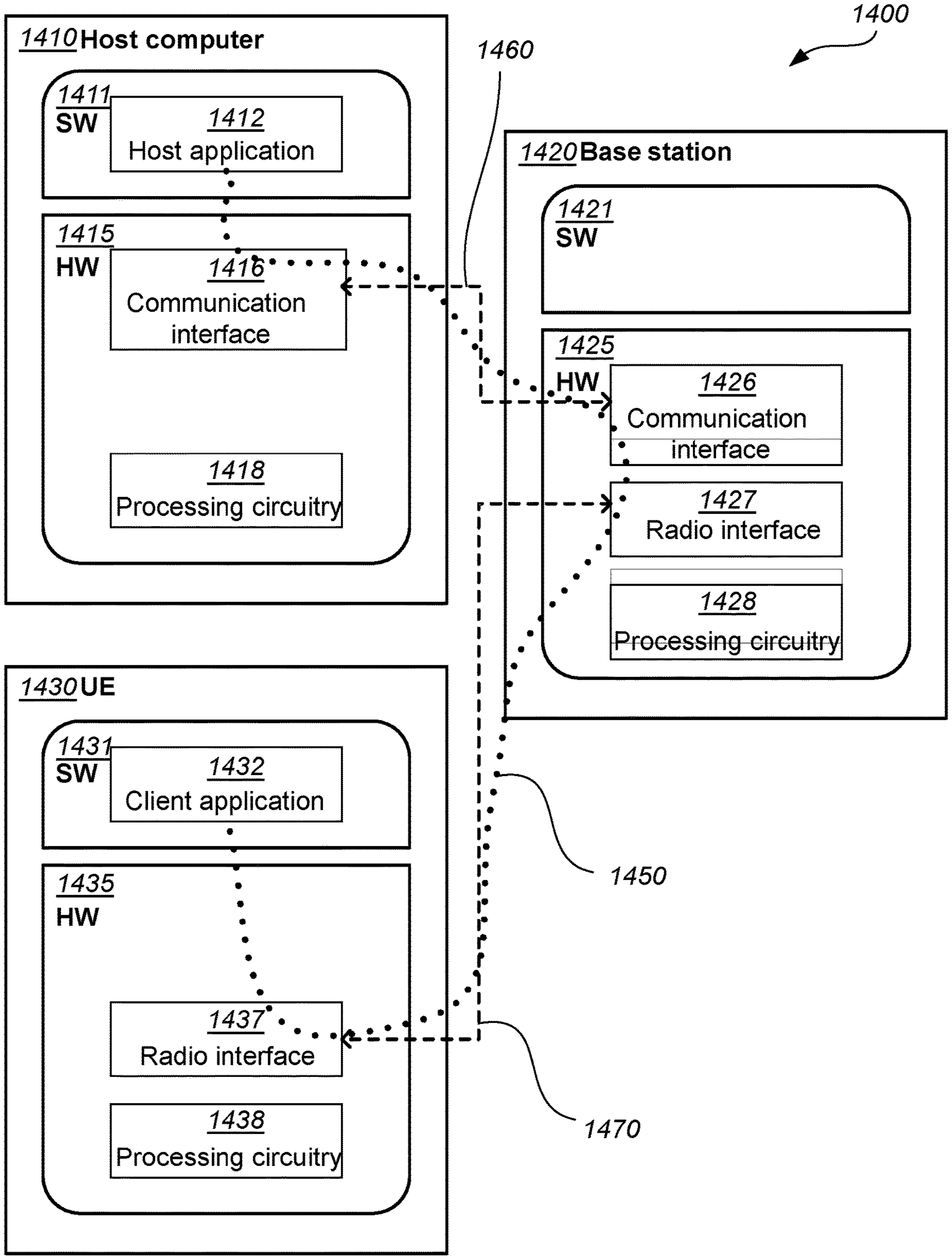
FIG. 10 is a generalized block diagram of a host computer communicating via a base station with a user equipment over a partially wireless connection.

FIG. 10: Host computer communicating via a base station with a user equipment over a partially wireless connection in accordance with some embodiments Example implementations, in accordance with an embodiment, of the user equipment 130, e.g., a UE, and any, or both, of the first node 111 and the second node 112, e.g., a base station and host computer discussed in the preceding paragraphs will now be described with reference to FIG. 10. In communication system 1400, such as the wireless communications network 100, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes any, or both, of the first node 111 and the second node 112, exemplified in FIG. 10 as a base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with the user equipment 130, exemplified in FIG. 10 as a UE 1430 located in a coverage area (not shown in FIG. 10) served by base station 1420. Communication interface 1426 may be configured to facilitate connection 1460 to host computer 1410. Connection 1460 may be direct or it may pass through a core network (not shown in FIG. 10) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 10 may be similar or identical to host computer 1330, one of base stations 1312*a*, 1312*b*, 1312*c* and one of UEs 1391, 1392 of FIG. 9, respectively. This is to say, the inner workings of these entities may be as shown in FIG. 10 and independently, the surrounding network topology may be that of FIG. 9.

In FIG. 10, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 11:
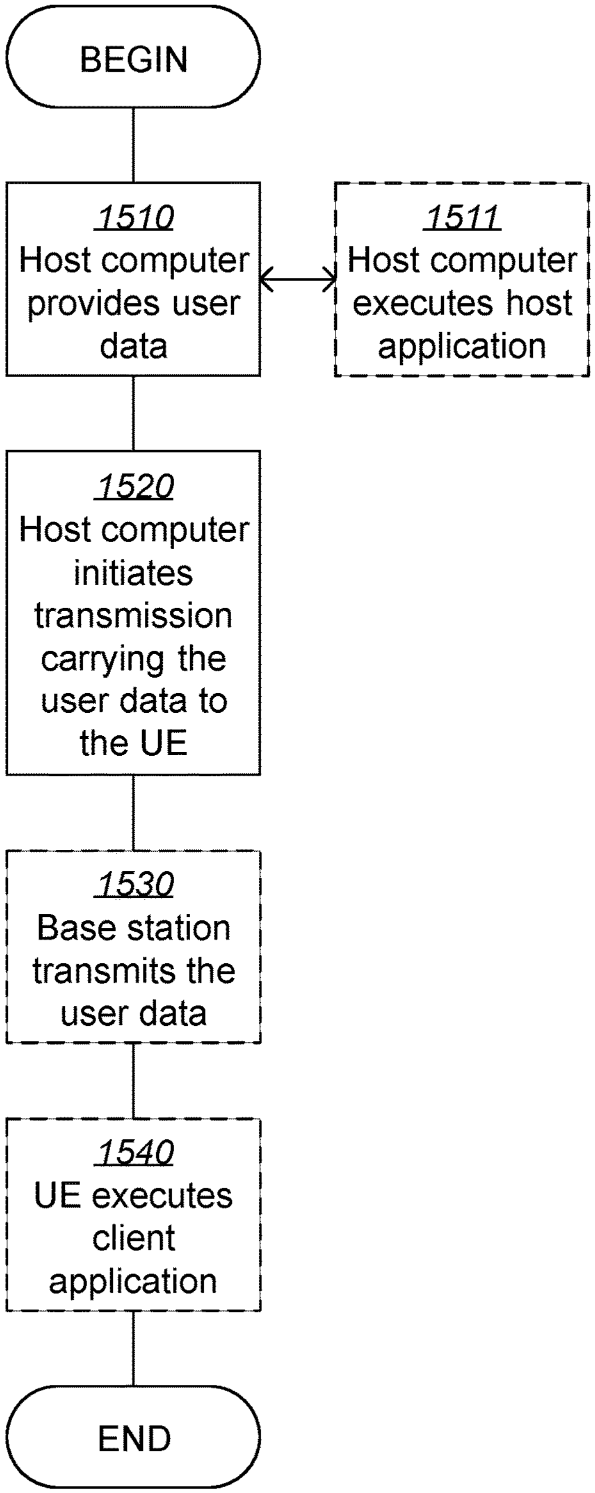
FIG. 11 is a flowchart depicting embodiments of a method in a communications system including a host computer, a base station and a user equipment.

FIG. 11: Methods implemented in a communication system including a host computer, a base station and a user equipment in accordance with some embodiments FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 12:
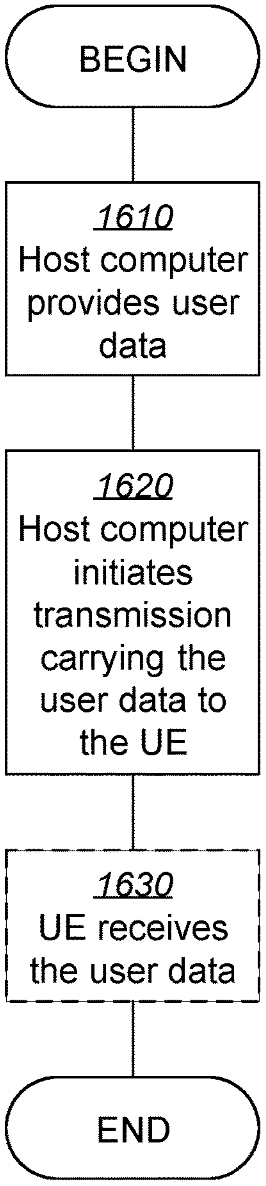
FIG. 12 is a flowchart depicting embodiments of a method in a communications system including a host computer, a base station and a user equipment.

FIG. 12: Methods implemented in a communication system including a host computer, a base station and a user equipment in accordance with some embodiments FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 13:
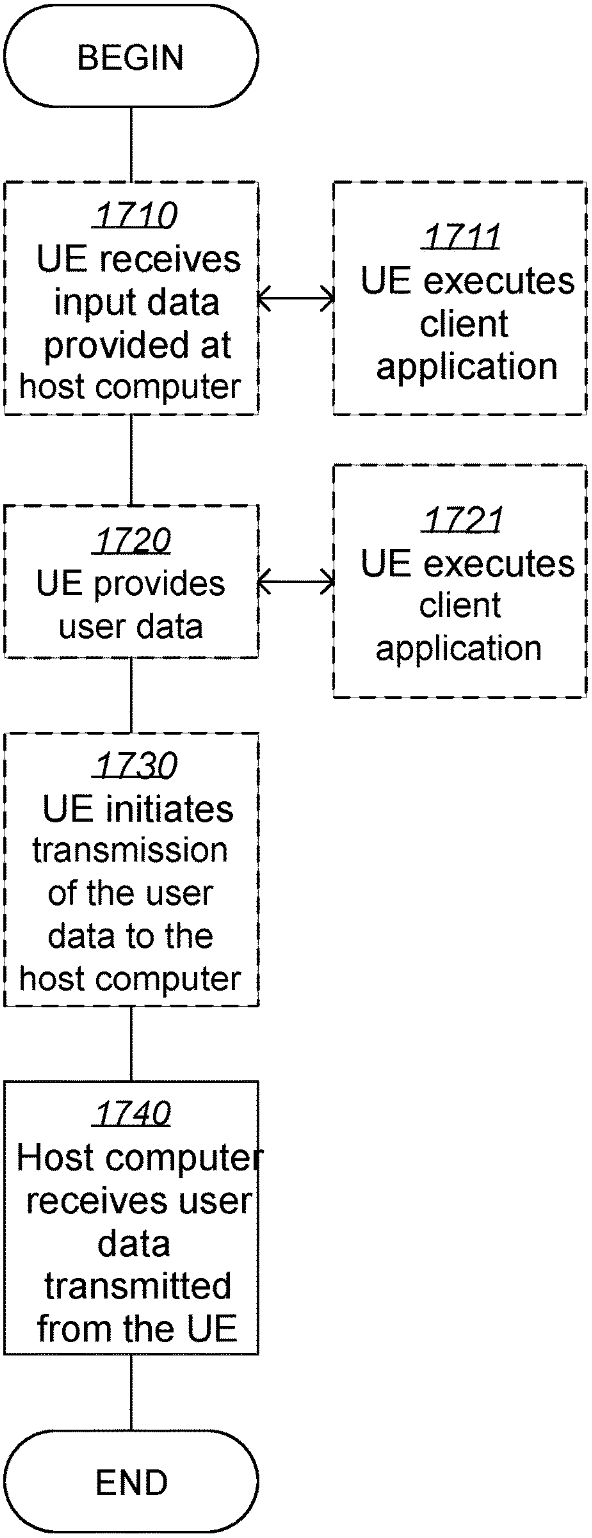
FIG. 13 is a flowchart depicting embodiments of a method in a communications system including a host computer, a base station and a user equipment.

FIG. 13: Methods implemented in a communication system including a host computer, a base station and a user equipment in accordance with some embodiments FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 14:
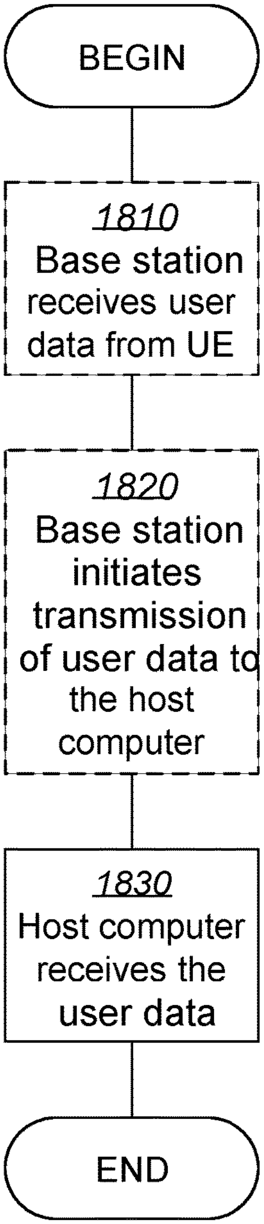
FIG. 14 is a flowchart depicting embodiments of a method in a communications system including a host computer, a base station and a user equipment.

FIG. 14: Methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

The invention claimed is:

1. A method, performed by a wireless device, for connecting to a second satellite in a non-terrestrial network (NTN), wherein the wireless device employs a first beamforming matrix for directing a radio beam from an antenna array of the wireless device to a first satellite, the method comprising:

determining an angular difference between a direction towards the first satellite and a direction towards the second satellite;

generating a rotation matrix using the determined angular difference between the direction towards the first satellite and the direction towards the second satellite to generate;

multiplying the first beamforming matrix with the rotation matrix to generate a second beamforming matrix; and using the second beamforming matrix generated using the determined angular difference and the first beamforming matrix to communicate with the second satellite, wherein prior to determining the rotation matrix, the wireless device determines an orientation of the antenna array relative to the positions of the satellites.

2. The method of claim 1, wherein the wireless device switches connection from the first satellite to the second satellite by exchanging the first beamforming matrix with the second beamforming matrix to be applied to the antenna array.

3. The method of claim 1, further comprising determining the angular difference based on knowledge about the position of the first satellite and the position of the second satellite.

4. The method of claim 1, wherein the angular difference comprises a difference in an azimuth angle and a difference in an elevation angle between the first and the second satellite.

5. The method of claim 1, wherein the wireless device determines the orientation of the antenna array from beamforming matrices toward satellite positions of the first satellite and the second satellite and their respective ephemeris data.

6. The method of claim 1, wherein determining the orientation of the antenna array comprises assuming a certain orientation for the antenna plane and trying to detect the second satellite based on the assumed orientation, and if the wireless device fails to detect the second satellite, the antenna plane is determined to be unknown.

7. The method of claim 6, wherein in case that the antenna plane orientation is unknown, the wireless device determines an angular search space from the ephemeris data, and determines the location of the second satellite by searching an RX beam of the second satellite within the search space.

8. The method of claim 1, wherein the wireless device acquires information about its own location.

9. The method of claim 1, wherein the wireless device performes a search around the determined second beamforming matrix to determine a refined second beamforming matrix, and using the refined second beam forming matrix for configuring the transmitter and/or receiver.

10. The method of claim 1, wherein the wireless device comprises a first antenna panel and a second antenna panel, where the first beamforming matrix is a beamforming matrix associated to a first antenna panel and the second beamforming matrix is a beamforming matrix associated to the second antenna panel.

11. The method of claim 1, wherein the wireless device comprises a plurality of antenna arrays, and wherein determining the second beamforming matrix includes determining a subset of antenna panels to use in the determined direction, and the rotation matrix is composed of a first rotation matrix determining a rotation between different antenna elements, and a second rotation matrix determining the difference in beam directions between said antenna panels for the first and second satellite, respectively.

12. The method of claim 1, wherein determining the second beamforming matrix includes determining an updated bandwidth part, BWP, to be used together with the second beam direction.

13. A wireless device configured to operate in a non-terrestrial network (NTN), the wireless device comprising:

radio interface circuitry configured to communicate with a network node via at least one cell; and processing circuitry operably coupled to the radio interface circuitry, whereby the processing circuitry and the radio interface circuitry are configured to perform the steps of claim 1.

14. The wireless device of claim 13, the wireless device comprises one or a plurality of sensors to support determining an orientation of the antenna plane.

15. The wireless device of claim 14, wherein the wireless device determines a vertical direction of the antenna plane.

16. The wireless device of claim 13, wherein wireless device comprises a GNSS receiver to determine its position in space.

17. A non-transitory, computer-readable medium storing computer-executable instructions that, when executed by processing circuitry of a wireless device, configure the wireless device to perform the method of claim 1.

18. A method performed by a network node for connecting a wireless device to a second satellite in a non-terrestrial network (NTN), wherein the wireless device employs a first beamforming matrix for directing a radio beam from an antenna array of the wireless device to a first satellite, the method comprising, the method comprising:

enabling the wireless device to perform a process comprising: i) determining an angular difference between a direction towards the first satellite and a direction towards the second satellite; ii) generating a rotation matrix using the determined angular difference between the direction towards the first satellite and the direction towards the second satellite to generate; iii) multiplying the first beamforming matrix with the rotation matrix to create a second beamforming matrix; and iv) using the second beamforming matrix to communicate with the second satellite, wherein the enabling comprises: transmitting to the wireless device ephemeris data of the first and the second satellite, thereby enabling the wireless device to determine the angular difference between the direction towards the first satellite and the direction towards the second satellite, and prior to determining the rotation matrix, the wireless device determines an orientation of the antenna array relative to the positions of the satellites.

19. A network node configured to serve at least one cell in a non-terrestrial network (NTN), the network node comprising:

radio interface circuitry configured to communicate with wireless devices via the at least one cell; and processing circuitry operably coupled to the radio interface circuitry, wherein the network node is configured to perform the method of claim 18.

* * * * *